United States Patent
Nagler, Jr.

(10) Patent No.: US 10,370,297 B2
(45) Date of Patent: Aug. 6, 2019

(54) GRANULAR DRY TO WET SLURRY BLENDER/DISPENSER SYSTEMS AND METHODS

(71) Applicant: The Euclid Chemical Company, Cleveland, OH (US)

(72) Inventor: Richard W. Nagler, Jr., Murrieta, CA (US)

(73) Assignee: The Euclid Chemical Company, Cleveland, OH (US)

( * ) Notice: Subject to any disclaimer, the term of this patent is extended or adjusted under 35 U.S.C. 154(b) by 0 days.

(21) Appl. No.: 15/956,881

(22) Filed: Apr. 19, 2018

(65) Prior Publication Data

US 2018/0237340 A1   Aug. 23, 2018

Related U.S. Application Data

(63) Continuation of application No. 14/146,518, filed on Jan. 2, 2014, now Pat. No. 9,950,955.

(60) Provisional application No. 61/748,379, filed on Jan. 2, 2013.

(51) Int. Cl.
  *C04B 28/00* (2006.01)
  *C04B 28/02* (2006.01)

(52) U.S. Cl.
  CPC .................... *C04B 28/02* (2013.01)

(58) Field of Classification Search
  CPC ........ B28C 7/00; B04B 28/02; C04B 2103/54
  See application file for complete search history.

(56) References Cited

U.S. PATENT DOCUMENTS

| | | |
|---|---|---|
| RE18,626 E | 10/1932 | White |
| 1,947,345 A | 2/1934 | Lillard |
| 2,557,386 A | 6/1951 | Lonier |
| 3,719,214 A | 3/1973 | Erndt |
| 3,822,866 A | 7/1974 | Daester et al. |
| 4,107,789 A | 8/1978 | McDowell |
| 4,178,340 A | 12/1979 | Hyytinen |
| 4,186,772 A | 2/1980 | Handleman |
| 4,344,859 A | 8/1982 | Burke, Jr. |
| 5,309,403 A | 5/1994 | Bartow |
| 5,785,421 A | 7/1998 | Milek |
| 6,382,947 B1 | 5/2002 | Bryant |
| 6,823,904 B2 | 11/2004 | Finke |
| 7,147,708 B2 | 12/2006 | Nagler, Jr. et al. |
| 2001/0000452 A1 | 4/2001 | Kochanowicz et al. |
| 2002/0191481 A1 | 12/2002 | Cox et al. |
| 2003/0076737 A1 | 4/2003 | Grassi |
| 2003/0227814 A1 | 12/2003 | Priesnitz et al. |
| 2004/0055512 A1 | 3/2004 | Nagler, Jr. |
| 2004/0055513 A1 | 3/2004 | Nagler, Jr. |
| 2005/0056190 A1 | 3/2005 | Nagler, Jr. et al. |
| 2006/0152995 A1 | 7/2006 | Kreutzer |
| 2006/0237088 A1 | 10/2006 | Morey et al. |

(Continued)

FOREIGN PATENT DOCUMENTS

JP   2005014285 A   1/2005

*Primary Examiner* — Anshu Bhatia
(74) *Attorney, Agent, or Firm* — Calfee, Halter & Griswold LLP (57) ABSTRACT

Systems and methods for weighing and mixing pigments for concrete in a granular form are provided. The systems and methods dispense one or more granular color pigments as a slurry at the point of concrete product.

11 Claims, 9 Drawing Sheets

(56) References Cited

U.S. PATENT DOCUMENTS

2008/0308167 A1* 12/2008 Hines .................. B01F 13/1055
137/896
2010/0137769 A1    12/2010 Graf
2011/0211418 A1     9/2011 Tassone et al.
2014/0355372 A1* 12/2014 Black .................. B01F 7/00216
366/8

* cited by examiner

GRANULAR DRY TO WET SLURRY BLENDER/DISPENSER SYSTEMS AND METHODS

RELATED APPLICATIONS

This application is a continuation of U.S. Non-Provisional application Ser. No. 14/146,518, filed on Jan. 2, 2014, and claims the benefit of and priority to U.S. Provisional Application No. 61/748,379, entitled "GRANULAR DRY TO WET SLURRY BLENDER/DISPENSER," which was filed on Jan. 2, 2013. The entire disclosure of this application is incorporated herein by reference.

FIELD

The present inventions relate to systems and methods for weighing and mixing pigment additives for concrete in a granular form. The systems and methods relate to dispensing one or more granular color pigments as a slurry at the point of concrete production.

BACKGROUND

Concrete production facilities add iron oxide pigments or other additives to concrete to color concrete, to add other attributes to concrete, or to otherwise beautify and increase value to the finished product. Iron oxide pigments or other concrete additives are available in powder, liquid, and granular forms. A granular form of additive is an additive formed into pellets, grains, or granules as opposed to a powder. Some concrete producers use automated color dispensers for dispensing iron oxides or other additives into the concrete mixer in order to reduce labor and increase consistency. Currently on the market there are systems to dispense powder, liquid, and granular additives.

Powder systems are too slow to keep up with modern concrete production requirements. Powder color or other powder additives have a tendency to "bridge" or clump up, making it difficult for the powder to flow through pipes and bins. Vibrators tend to pack the powder in the bins, so high voltage augers are used. Occasionally, bridge "breakers" are added to help the powder flow through the bins. In many cases, powder pigment cannot be dispensed into concrete at the point of production due to these issues. Dust control may also be required for automated powdered color pigment.

Liquid color is produced by blending powder iron oxide, water, and chemicals. Liquid color requires an average of 40% higher dosage by weight than powder or granular color to compensate for the liquid, primarily water, in the pigment formula. A liquid color mixture should be kept in a temperature-controlled environment to prevent freezing and drying of the product. A liquid color mixture should also be recycled regularly to prevent settling. Accordingly, it is often difficult to use liquid color mixtures at a job site.

Granular pigment is also produced from powder pigment. The purpose of producing the granular form is usually for automation in material handling. Granular pigment does not bridge or clump like powder pigment, and with minimal vibration or agitation, the granular pigment flows easily. There are some granular systems in the market, and some of these systems use 3-phase, high-voltage power and are very slow. Other granular systems dispense the pigment pneumatically through air pressure, which can be a major burden on the concrete production equipment, such as the plant's air compressor system. Dispensing the granular pigment in dry form directly into a cement mixer can also cause some dispersion issues, causing lower tint or color strengths in the finished concrete. Thus, efficient and economical systems and methods for mixing granular pigment with cement at a job site are presently unknown.

BRIEF SUMMARY

The present disclosure is directed to systems and methods for weighing and mixing additives for concrete in a granular form at a job site. The inventive system consumes minimal power and uses gravity to feed and move the granular pigment and slurries through the system.

In accordance with one embodiment, a system for weighing and mixing pigment additives for concrete in a granular form is disclosed. The system comprises: at least one tote, at least one hopper downstream of the at least one tote, a weigh vessel downstream of the at least one hopper, at least one valve downstream from the hopper and upstream from the weigh vessel, at least one mixing blade mounted in the weigh vessel, and a controller.

Methods of controlling operation of a concrete additive mixing system are also disclosed. One method comprises: selecting a recipe, at least one granular concrete additive, and a target batch weight, determining the amount of water required for the recipe selected, filling a weigh vessel with the amount of water required for the recipe selected, opening at least one valve to release the granular concrete additive into the weigh vessel, mixing the granular concrete additive and water in the weigh vessel, determining the weight of the combined water and concrete additive in said weigh vessel, and opening or closing said at least one valve in response to the combined weight of water and granular concrete additive in said weigh vessel.

BRIEF DESCRIPTION OF THE DRAWINGS

The accompanying drawings, which are incorporated in and constitute a part of this specification, illustrate some exemplary embodiments disclosed herein, and together with the description, serve to explain principles of the embodiments disclosed herein.

DETAILED DESCRIPTION

Exemplary systems and methods for weighing and mixing pigment additives for concrete in a granular form are described herein. The logic flow of software for a weighing system is also described. These and other features of the system, as well as some of the many optional variations and additions, are described in detail hereinafter. The embodiments disclosed herein may be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which these embodiments belong. The terminology used in the description herein is for describing particular embodiments only and is not intended to be limiting of the embodiments. All publications, patent applications, patents, and other references mentioned herein are incorporated by reference in their entirety.

As used in the description of the invention and the appended claims, the singular forms "a," "an," and "the" are intended to include the plural forms as well, unless the context clearly indicates otherwise. To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

The following are definitions of exemplary terms used throughout the disclosure. Both singular and plural forms of all terms fall within each meaning:

As it pertains to the present disclosure, "granular" pigment or additive refers to pigment material that has been created from a powder form by means of compaction or spray drying, or a combination thereof. Compacted granular pigment is powder pigment that is forced together under pressure. Spray dried powder pigment is first made wet with water and a binder, and during the drying process a granular pigment is formed. Granular pigment particles and their formation are known in the art.

"Software" or "computer program" as used herein includes, but is not limited to, one or more computer or machine readable and/or executable instructions that cause a computer, microprocessor, logic circuit, chip, programmable logic controller, or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, an app, a function call, a servlet, an applet, instructions stored in a memory or any other computer readable medium, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing unit" as used herein includes, but is not limited to, any programmed or programmable electronic device, computer, portable digital assistant ("PDA"), cell phone, pad, notebook, microprocessor, controller, or logic circuit that can store, retrieve, and process data.

A "Network" as used herein includes, but is not limited to, a collection of hardware components and computers or machines interconnected by communication channels that allow sharing of resources and information, including without limitation, the worldwide web or internet. A network can be a wireless network or wired network or a combination of both.

Disclosed herein are systems and methods for weighing and mixing pigment additives for concrete in a granular form. One exemplary embodiment of the concrete additive mixing system stores dry granulated pigment or other granular additives for use in concrete production in one or more removable totes. The pigment or other granular additive is weighed together with water during mixing at the time a batch of granular pigment is turned into a slurry for mixing into concrete. Weighing granular color material as it is mixing with water, and mixing while weighing increases the speed of the entire process and allows delivery of the resulting slurry at a job site through the use of gravity.

While these systems and methods can be used with any granular additive for concrete preparation and manufacturing, these systems and methods are described with respect to use with granular color pigments and concrete. However, the invention is not limited to uses or methods for pigment by this description, but rather, the invention can be used for any granular concrete additive.

Figure 1:
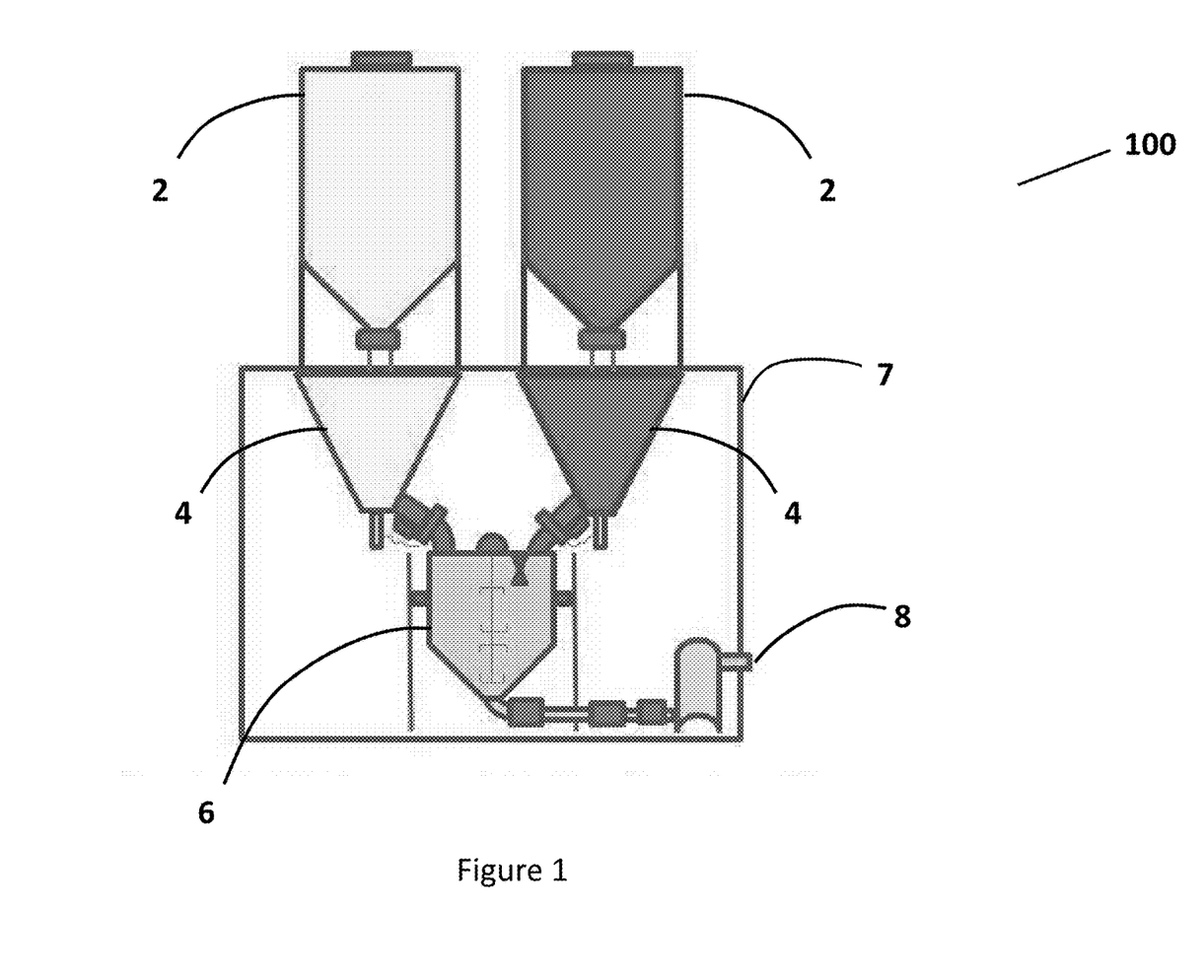
FIG. 1 is a side view of an exemplary embodiment of a weighing and mixing system.

Now, with particular reference to the drawings, exemplary embodiments of the invention are described below. The drawings disclosed herein should not be construed as limiting, but are provided for purposes of illustration. FIG. 1 and FIGS. 3 through 10 depict exemplary embodiments of gravity fed granular pigment mixing system 100. FIG. 1 depicts a schematic side view of a mixing system 100. Each granular additive is stored in a top tote 2. In certain embodiments, four granular pigment additives are stored in four separate removable top totes 2. As can be seen in the Figures, each tote is intended to be used with a different pigment or color of granular material. The top totes 2 may be designed to store a full or "super" sack of granular color material. A super sack is a term of art used for bulk bags of granular or other cement additives. Super sacks may be of various types and sizes, but one exemplary super sack is approximately 3 foot square with an opening on the top for filling and a snout on the bottom for emptying. In one exemplary embodiment, the top totes 2 are 100 Liter Top Storage Bins manufactured by Reliable Sheet Metal located in Fullerton, Calif., and are comprised of sheet metal. However, the top totes can be comprised of any suitable material such as plastic or another metal.

As can be seen in the Figures, a hopper 4 is situated downstream from each top tote 2. In certain embodiments, hoppers 4 may be permanently mounted to a frame or base 7 and situated downstream from the four removable top totes 2. In one embodiment, the inside hoppers are permanently mounted, whereas the top totes can be removed for replenishment. However, in other embodiments, the hoppers 4 may be removable from the frame or base 7 as well. In one embodiment, each hopper 4 is designed to store one-half of a "super" sack of granular color material, but can be of any size. In one exemplary embodiment, the hoppers 4 are 42 inches×18 inches Base Storage Hoppers manufactured by Reliable Sheet Metal, and are comprised of sheet metal. However, the hoppers can be comprised of any suitable material such as plastic or another metal. The top totes 2 can be simultaneously removed and replenished while the concrete additive mixing system is operating. Granular material from within the inside hoppers 4 can be used during removal of the top totes 2 for refilling. Each hopper 4 and tote 2 combination corresponds to a different color of granular pigment. Thus, in the embodiment shown in the Figures, there are four colors of granules that may be used for any pigment recipe.

Figure 2A:
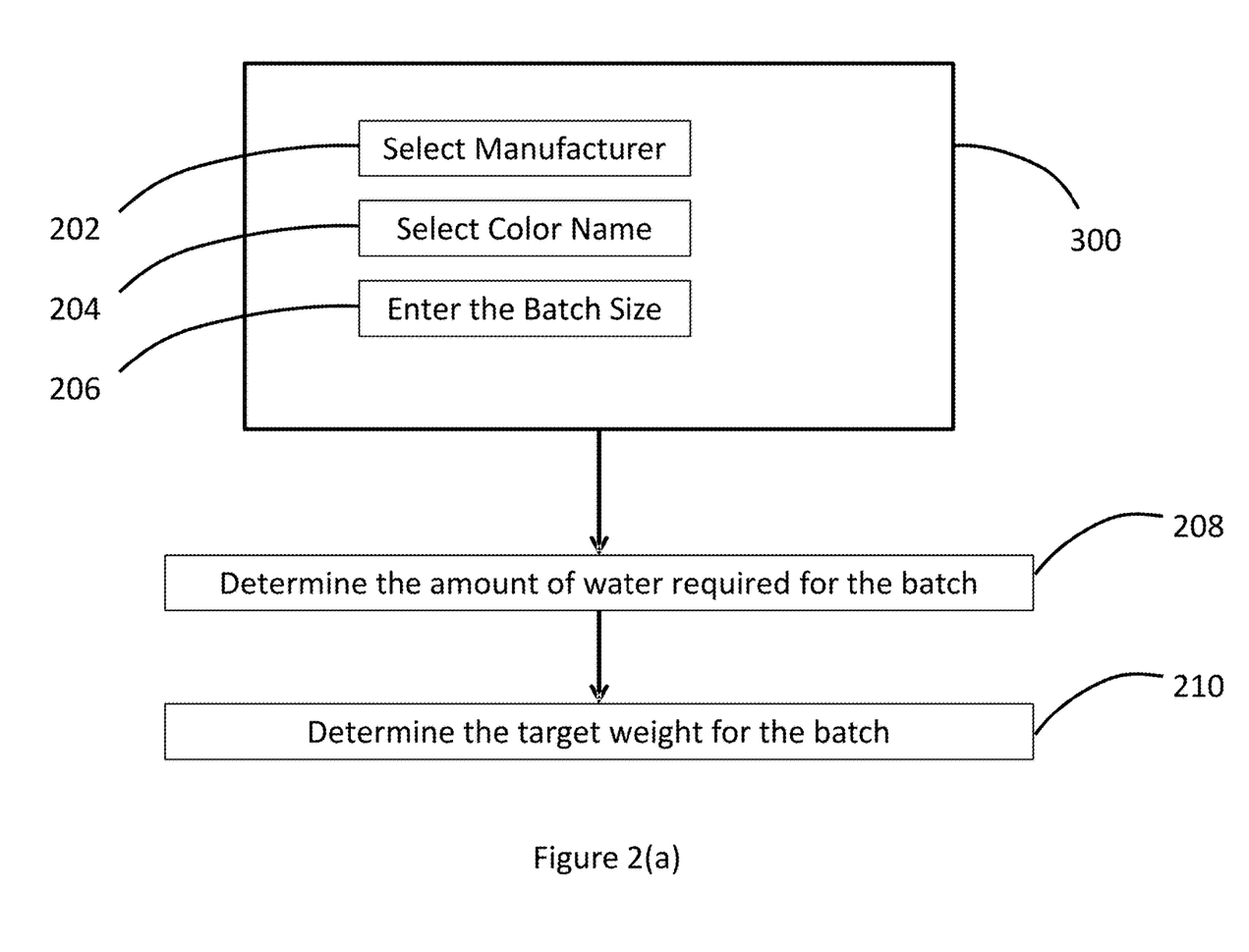
FIGS. 2(a) and 2(b) depict the logic flow of an exemplary embodiment of weighing systems and methods.

As further described herein, after a controller 300 (shown in FIG. 2(a)) actuates the start of the mixing process, the water fill valve 30 opens to release water into the initially empty weigh vessel 6. The amount of water is weighed in the weigh vessel 6 by load cells 28, and an electrical signal indicative of the weight of the water is transmitted to the controller 300 until a set point for the water weight is reached.

The weigh vessel may be of any suitable configuration. In various embodiments, the weigh vessel may be an 8 foot×16 foot container or an 8 foot by 10 foot container, both manufactured by Martin Container located in Carson, Calif.

Load cells 28 are known load cells or strain gages that generate an electrical signal indicative of the weight of the weigh vessel that can be detected by the controller 300. This signal is typically a DC voltage signal that is an analog signal, but could also be digital in form. In one exemplary embodiment, the load cells are model No. SBS-500 manufactured by Florida Industrial Scale Company located in Longwood, Fla., coupled with a Rice Lake Scale Indicator model No. IQ355.

As further described below, after the correct amount of water is released into the weigh vessel 6, granular pigment additive is then added to the weigh vessel 6. The granular additive is released from the inside hopper 4 to the weigh vessel 6 via a fill tube 10. In certain embodiments, the fill tube has an angle θ that is between about 20 degrees and about 80 degrees. In an exemplary embodiment, the fill tube angle θ is about 35 degrees. In certain embodiments, each fill tube is equipped with a known vibrating mechanism 14 to aid the movement of the granular additive through the fill tubes. In one exemplary embodiment, the vibrating mechanism is a model ATU41 Vibrator manufactured by Martin Engineering. This model is a pneumatic turbine vibrator that mounts on the bottom of the fill tube. Other known vibrators that could be used are called "knockers" or electric vibrators.

Each fill tube 10 is connected to a valve 12 (see FIG. 4), which controls the flow of the granular additive from the hopper 4 to the weigh vessel 6. In accordance with one embodiment, the valves 12 are butterfly valves. In an exemplary embodiment, the valves are 4 inch electronically controlled and pneumatically actuated Butterfly Valves purchased from AC Controls Co., Inc. located in Charlotte, N.C., which are Keystone Valve Model No. 4-221-789-62-20-0000 coupled with an actuator model No. 001-01009-MRP-004U-K-D000-DA. In other embodiments, the valves may be any control valve, any actuated valve, a ball valve, a gate valve, a pinch valve, or any combination thereof. This disclosure is not limited to any valve constructions shown in the figures or described herein.

Figure 8:
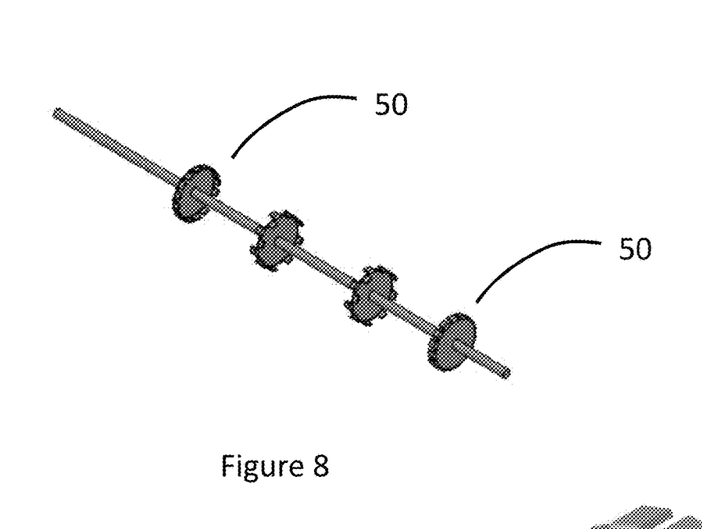
FIGS. 8 through 10 depict various exemplary embodiments of mixing blade configurations.
Figure 9:
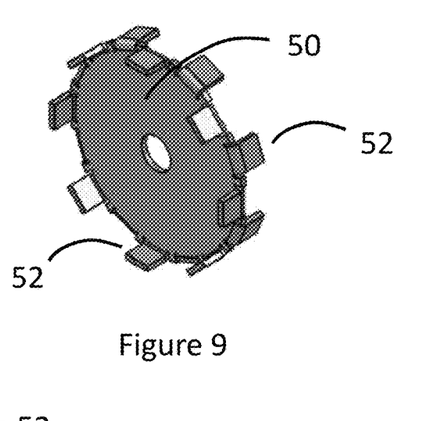
Figure 10:
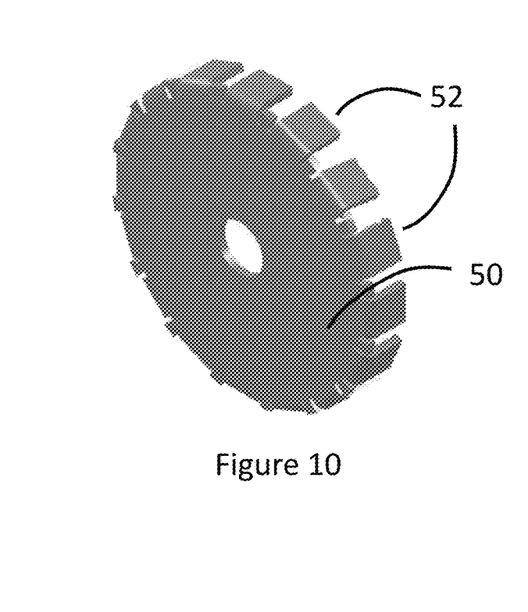

In an exemplary embodiment, the valves 12 open and close at four intervals: high, medium, low, and "inch." However, valves 12 could open and close in any controllable manner in other embodiments. At the first interval, "high speed," the valve 12 is fully open. Granular pigment flows freely through the fill tube 10 and open valve 12, with the associated vibrator 14 aiding the movement of the pigment into the weigh vessel 6. The granular pigment flows into the weigh vessel 6 while the mixing motor 22 mixes the mixture of water and granular pigment with the mixing blades 24 mounted to the weigh vessel. In an exemplary embodiment, the mixing motor is a Mixing Motor Model No. 4Z231 manufactured and/or sold by Grainger Industrial Supply. With reference to FIGS. 8 through 10, in certain embodiments, the mixing blades are configured to shear the granules during mixing to provide equal tint strength throughout the mixture. In an exemplary embodiment, the mixing blades 24 are four circular wheels 50 with teeth 52 on their outer perimeter that point either up or down in an alternating fashion. In this configuration, the teeth 52 are at approximately 90° or normal to the circular wheel 50. In addition, the wheels may be configured so that the teeth protrude in opposite directions. This configuration of mixing blade is shown to be effective in mixing granular slurries in embodiments of this mixing system. However, the mixing blades disclosed herein are not limited to this mixing blade construction, and may be used with any known apparatus used to mix slurries or liquids.

Figure 2B:
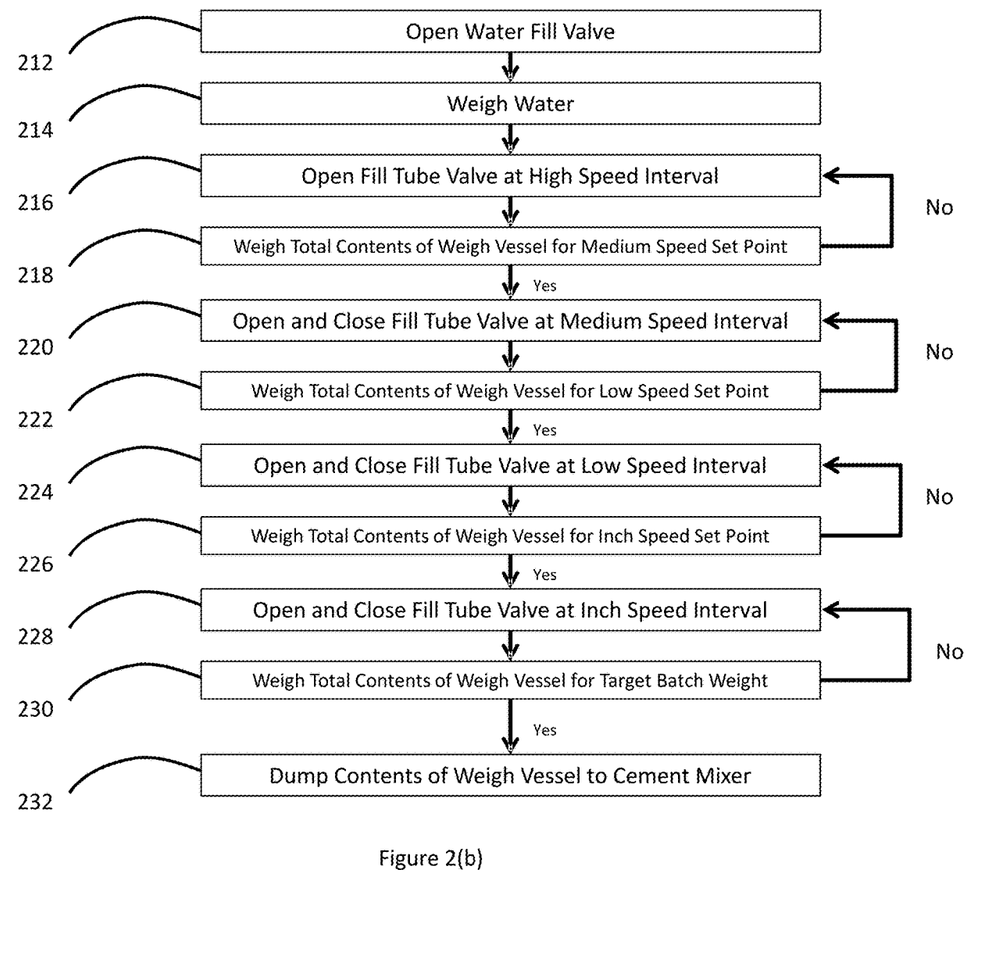
Figure 3:
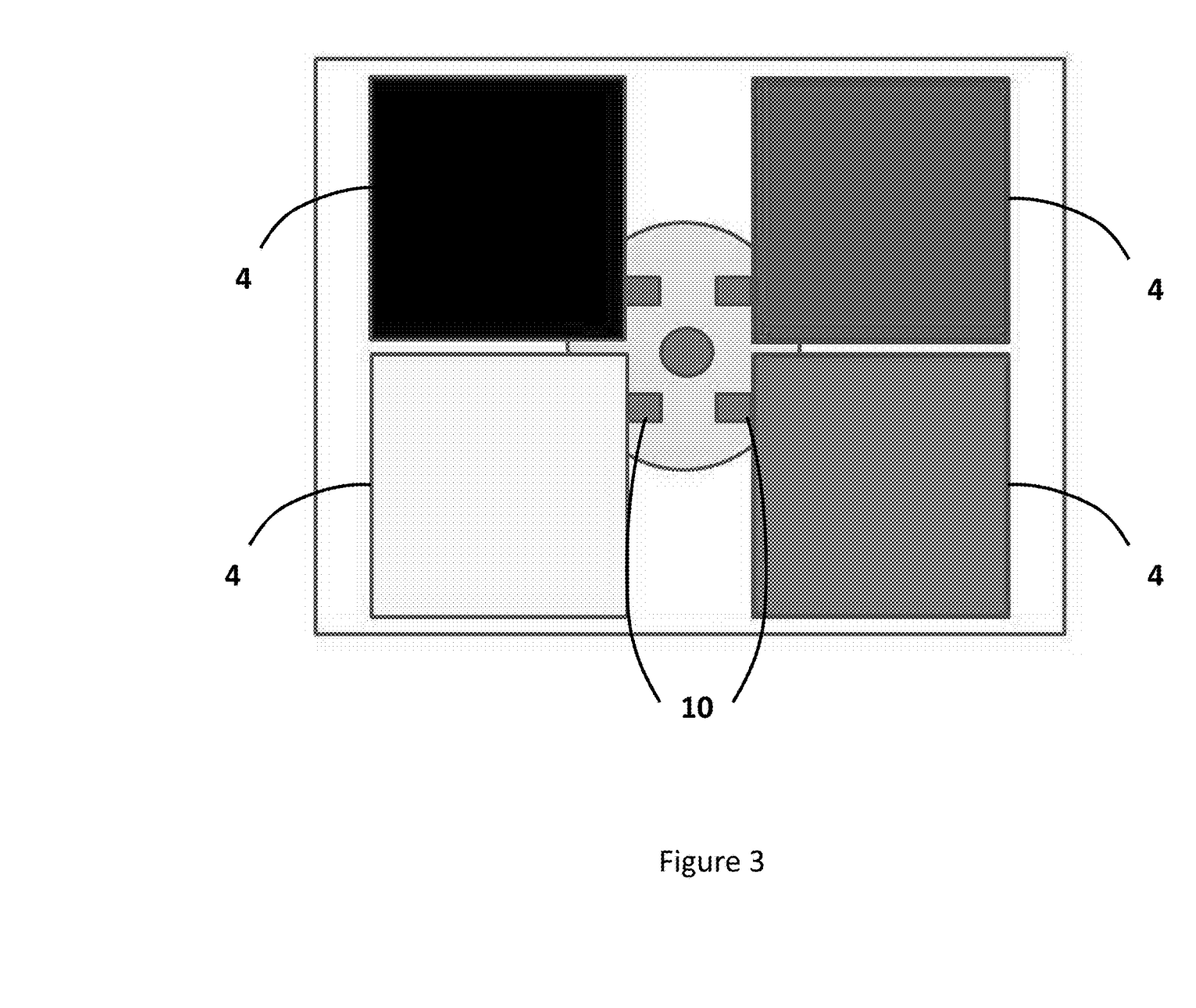
FIG. 3 is a top view of an exemplary embodiment of a weighing and mixing system.
Figure 4:
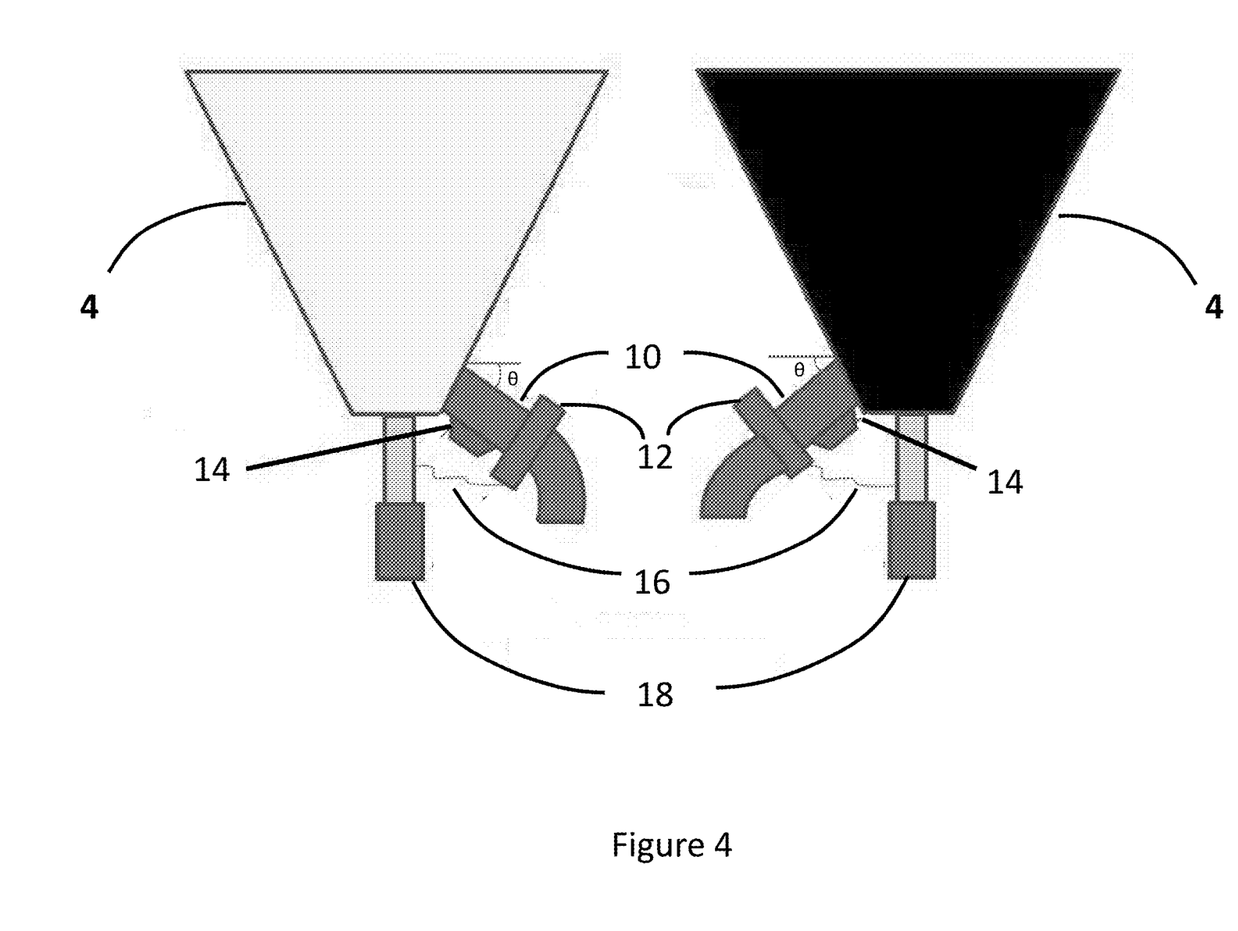
FIG. 4 is a schematic drawing of a front view of an exemplary embodiment of a weighing system.
Figure 5:
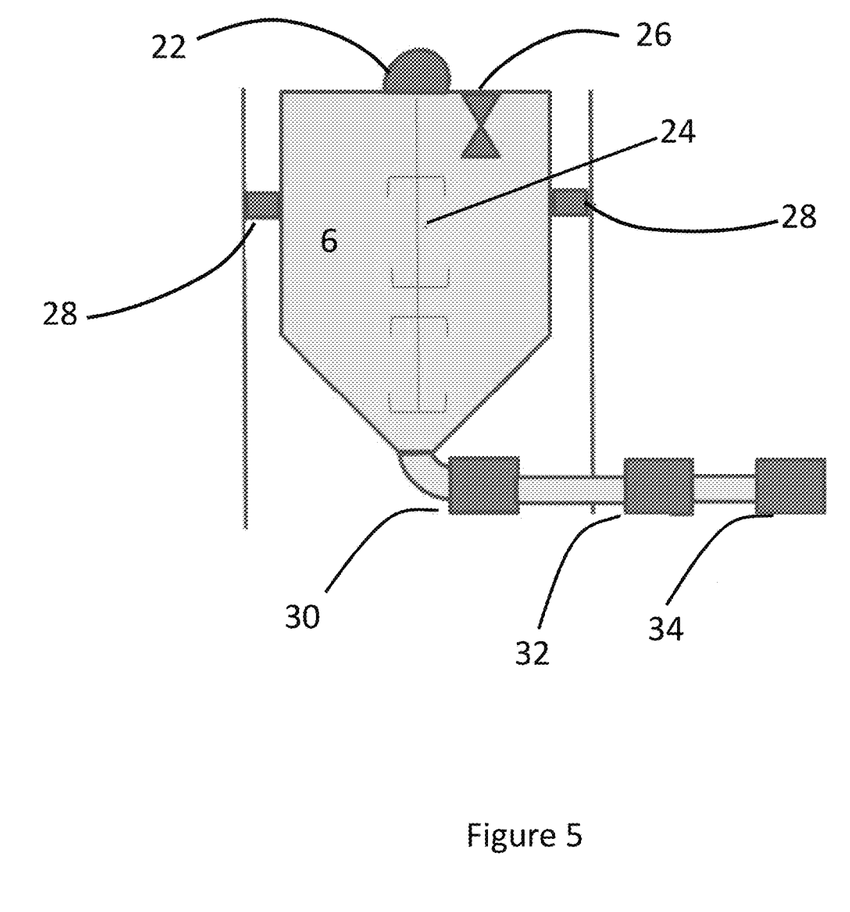
FIG. 5 is a schematic drawing of a front view of an exemplary embodiment of a weigh vessel.
Figure 6:
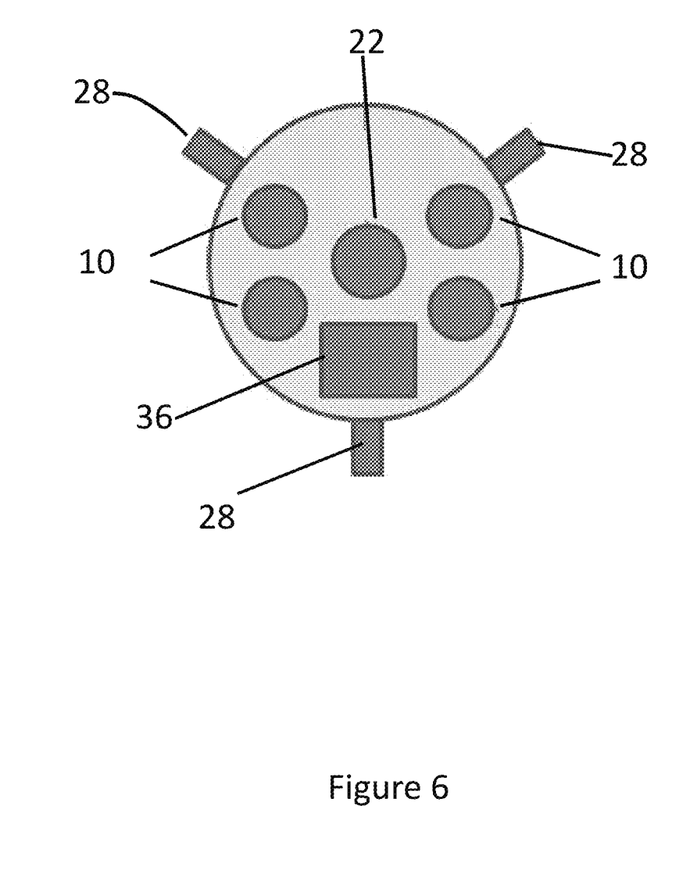
FIG. 6 is a schematic drawing of a top view of an exemplary embodiment of a weigh vessel.
Figure 7:
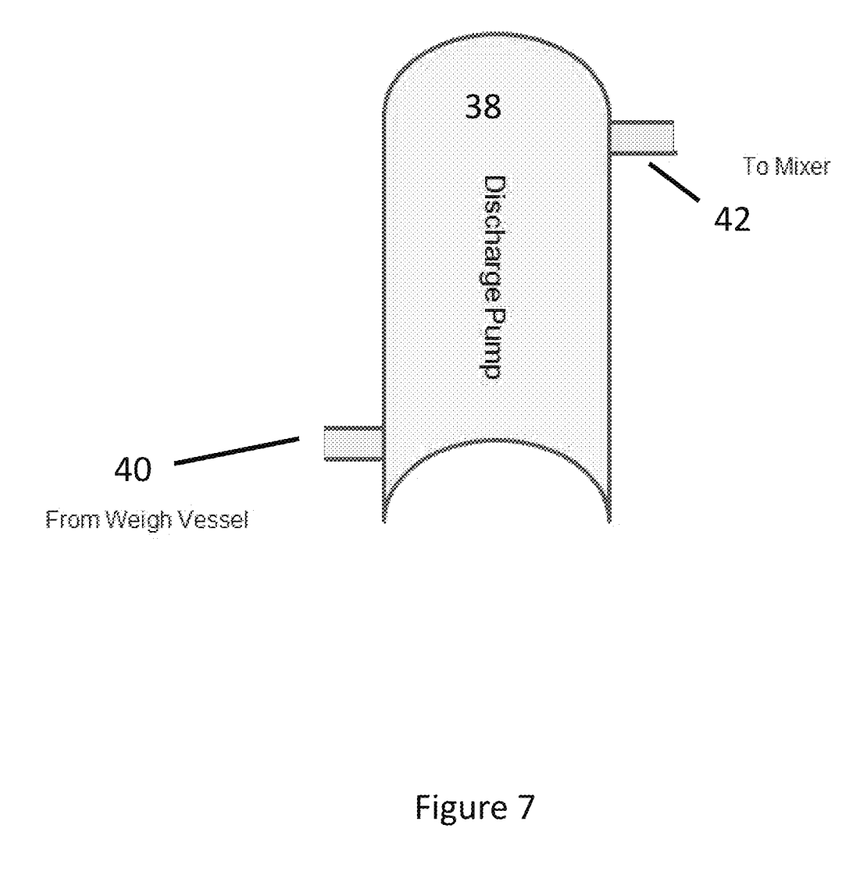
FIG. 7 is a schematic drawing of a side view of an exemplary embodiment of a discharge pump.

With reference to FIGS. 2(a) and 2(b), the logic flow of an exemplary embodiment of the systems and methods are described. The flow of the logic of the methods and systems will be described referring now to FIG. 2(a). This logic flow may be residing or embodied in software within a controller or computer 300, but can be accessed through a PDA, pad, cell phone, or any other device through a wired or a wireless network. The system operator first selects the pigment manufacturer in step 202 and the color or colors of pigment in step 204 to be created or batched. These items are stored in the memory of the system's computer 300. The operator then enters in the cement weight and/or the concrete batch size in step 206, and then presses or actuates the "start" batch button or control. In certain embodiments, the cement weight can be entered in pounds of cement per yard. In other embodiments, the cement weight can be entered in number of 94 pound cement sacks per yard of concrete. The granular color system calculates the water required for the batch in step 208 based on user preferences and the recipe selected. In one embodiment, a water-to-color ratio for each base color and a mix water minimum is used to calculate the amount of water required. For example, the "yellow" granular pigment may have a water-to-color ratio of 1.7, meaning 1 pound of yellow granules requires 1.7 pounds of water for mixing. The mix water minimum can be 0 to 150, and is pre-set by user preference, which may be based on the size of the components in the system. The system uses the greater of the two values of the water-to-color ratio and the mix water minimum. Accordingly, if the calculated water based on the water-to-color ratio is less than the mix water minimum, the system uses the minimum. In other embodiments, no mix water minimum is used and the water-to-color ratio determines the amount of water used. Based on the recipe selected, a target or batch weight for the mixture of particular pigment is set by the computer in step 210. A pigment recipe can also include more than one color of granules, and the batch weight of this blended recipe is set in the same way described above for each color of granule.

Referring now to FIG. 2(*b*), after the user has completed the steps described in FIG. 2(*a*) setting up or configuring the mixing process, the process begins at step 212 by opening the water fill valve as described above. While mixing, the entire water and granular additive mixture is simultaneously and continuously weighed by the load cells 28. The load cells constantly provide weight feedback signals from the weigh vessel 6 to the computer 300.

In step 216, the valve 12 is fully open at "high speed." Granular pigment flows freely through the fill tube 10 and open valve 12. While operating at high speed, the entire water and granular additive mixture is simultaneously and continuously weighed in step 218. As the granular additive system meets a medium speed set point, the controller adjusts the system to "medium speed" in step 220 while a mixing motor (not shown) and blades shown in FIGS. 8 through 10 continue to mix. In certain embodiments, the system operates at medium speed when the weight of water and concrete additive in the weigh vessel is about 50 pounds from the target batch weight. However, the systems and methods described herein are not limited to a particular set point from the target batch weight. Upon switching from high speed to medium speed, the valve starts to open and close repeatedly to slow the flow of the granular pigment. In certain embodiments, at "medium speed" the valve alternates between an open position and a closed position at substantially equal intervals. In certain embodiments, at medium speed the valve alternates between an open position for about 0.75 seconds to about 2 seconds, and a closed position for about 0.75 seconds to about 2 seconds. In other embodiments, at medium speed the valve alternates between an open position for about 1 second and a closed position for about 1 second. The inventions described herein, however, are not limited to any particular time interval for medium speed, and the valve 12 could be in either an open or a closed position for any period of time between 0 seconds and 5 minutes, based on user preference and system design.

While operating at medium speed, the entire water and granular additive mixture is simultaneously and continuously weighed in step 222. As the granular additive system meets a low speed set point, the controller adjusts the system to "low speed" in step 224 while the mixing motor and mixing blades shown in FIGS. 8 through 10 continue to mix. In certain embodiments, the system operates at low speed when the weight of water and concrete additive in the weigh vessel is about 15 pounds from the target batch weight. However, the systems and methods described herein are not limited to a particular set point from the target batch weight. At low speed, the valve alternates between an open position and a closed position such that the valve is in a closed position for a longer interval than an open position. In certain embodiments, at "low speed" the valve alternates between an open position for about 0.3 seconds to about 0.8 seconds, and a closed position for about 1.3 seconds to about 1.8 seconds. In other embodiments, at low speed the valve alternates between an open position for about 0.5 seconds and a closed position for about 1.5 seconds. The inventions described herein, however, are not limited to any particular time interval for low speed, and the valve 12 could be in either an open or a closed position for any period of time between 0 seconds and 5 minutes, based on user preference and system design.

While operating at "low speed," the entire water and granular additive mixture is simultaneously and continuously weighed in step 226. As the granular additive system approaches an inch speed set point, the controller adjusts the system to "inch speed" in step 228. During inch speed, the entire mixture continues to be mixed by the mixing motor and the mixing blades shown in FIGS. 8 through 10. In certain embodiments, the system operates at inch speed when the weight of the water and concrete additive in the weigh vessel is from about 1 pound to about 4 pounds from the target batch weight. However, the systems and methods described herein are not limited to a particular set point from the target batch weight. In certain embodiments, the mixing motor may turn off at inch speed. In certain embodiments, at inch speed the valve alternates between an open position and a closed position such that the valve is in a closed position for a longer interval than that of "low speed." In certain embodiments, at inch speed the valve alternates between an open position for about 0.1 seconds to about 0.3 seconds, and a closed position for about 2 seconds to about 4 seconds. In other embodiments, at inch speed the valve alternates between an open position for about 0.25 seconds and a closed position for about 2.5 seconds. The inventions described herein, however, are not limited to any particular time interval for inch speed, and the valve 12 could be in either an open or a closed position for any period of time between 0 seconds and 5 minutes, based on user preference and system design.

While operating at inch speed, the entire water and granular additive mixture is simultaneously and continuously weighed in step 230. In step 232, when the granular additive system reaches the target batch weight, the controller displays a message that the granular color batch is complete as newly-created slurry and ready to discharge into the concrete mixer 8. Because the system mixes batches while obtaining weight feedback, the color mixture can be dispensed in step 232 as soon as the target batch weight set point is reached and mixing is completed. Thereafter, the discharge valve 32 opens and the discharge pump 38 turns on, and the slurry is pumped from the weigh vessel into a concrete mixer 8. In certain embodiments, the concrete mixer 8 may be mounted on a vehicle such as a truck or a railroad car. In other embodiments, the concrete mixer 8 may be located at a jobsite for pouring and setting of the concrete. The weigh vessel 6 and discharge pump 38 are cleaned using the spray nozzle 26 and water fill valve 30 with a predetermined quantity of water that is also discharged into the concrete mixer. In one embodiment, the spray nozzle is a 180 Degree Rotating Spray Nozzle, model No. 3/4TWK180180316SS manufactured by Bex, located in Ann Arbor, Mich. The air purge valve 34 opens and blows the discharge line empty. Thereafter, the granular color system is ready for the next batch of pigment.

In certain embodiments, the above opening and closing of the valve at particular intervals repeats for each granular color required for a selected color recipe. In certain embodiments, the system's software allows the granular pigment to weigh as fast as 12 pounds per second in high speed mode with accuracy of about 0.10 of a pound. In certain embodiments, the valves receive open or close signals as frequently as about 0.05 of a second. However, the inventions described herein are not limited to these speeds or these upper ranges of speed.

The systems and methods described herein are not limited to any particular valve construction. In addition, the operation of the valves described herein is not limited to opening and closing a valve at timed intervals. For example, in accordance with other embodiments, electronically controlled valves may be configured to open to a particular percentage of opening at certain intermediate weight set points, in order to control the flow of the granular additive into the weigh vessel. For example, the valve may be fully open at the beginning of a batch mixing period, and gradually close as the weight of the batch increases, until it is fully closed when the weight set point for a batch is reached.

In various embodiments of the system disclosed herein, four primary granular colors are used in formulas or recipes to produce hundreds of color combinations for concrete. In exemplary embodiments, these four colors comprise yellow, light red (or orange red), medium red (or blue red), and black. Each of these colors use a different tote 2/hopper 4 combination in the system. In one illustrative example, a recipe for 564 pounds of colored cement may include a total of 7.32 pounds of colored pigment. To reach this illustrative shade of colored cement, 3.84 pounds of yellow pigment, 0.84 pounds of light red pigment, and 2.64 pounds of black pigment are weighed and mixed by the system and method disclosed herein. This example is provided solely for the purpose of illustration, and is not to be constructed as limiting the present disclosure, as many variations of the number of pigments, shades of pigments, and amounts of pigments in each batch of cement are possible and in fact infinite in number.

Therefore, as can be seen above, this system deposits one or more color pigments together with water into a weigh vessel for particular recipes. Each color of pigment is deposited on top of the previous colors deposited into the weigh vessel, and the one or more pigment colors are mixed together and with water and continuously weighed together. The weight set points of a batch of color pigment are added together with, or otherwise compensate for, other pigment previously weighed and previously mixed in the weigh vessel. Only after the total batch weight for a complete pigment recipe or slurry comprised of more than one granular material is reached will the discharge valve 32 open and the slurry be pumped from the weigh vessel.

This system moves and weighs granular color pigment and other concrete additives with gravity and uses vibrating fill tubes with valves to help the granular pigment move quickly. Further, this system controls the flow or fill rate into the weigh vessel using consistent weight feedback controls, and weighs the granular pigment combined with the mixing water to create a slurry. All of these process steps are designed for simplicity, speed accuracy, and safety.

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general disclosure herein.

Any description of specific embodiments of the systems and methods herein has been given by way of example. The general inventive concepts are not limited to any particular manufacturer or commercial product. Further, any of the exemplary embodiments described herein may be combined together and used in any combination with one another. It is sought, therefore, to cover all such changes and modifications as may fall within the spirit and scope of the general inventive concepts, as described herein, and equivalents thereof.

What is claimed is:

1. A method of controlling operation of a concrete additive mixing system, comprising:
    selecting a recipe, at least one granular concrete additive, and a target batch weight;
    determining the amount of water required for the recipe selected;
    filling a weigh vessel with the amount of water required for the recipe selected;
    opening at least one valve to release the granular concrete additive into the weigh vessel;
    mixing the granular concrete additive and water in the weigh vessel;
    determining the weight of the combined water and concrete additive in said weigh vessel;
    transmitting the weight of the combined water and granular concrete additive in said weigh vessel to a controller; and
    opening or closing said at least one valve in response to the combined weight of water and granular concrete additive in said weigh vessel;
    wherein opening said at least one valve occurs at four intervals, the intervals comprising:
        (i) a high speed, wherein the valve is open;
        (ii) a medium speed, wherein the valve alternates between an open position and a closed position at equal intervals;
        (iii) a low speed, wherein the valve alternates between an open position and a closed position such that the valve is in a closed position for a longer interval than an open position; and
        (iv) an inch speed, wherein the valve alternates between an open position and a closed position such that the valve is in a closed position for a longer interval than that of step (iii).

2. The method of claim 1, wherein said granular concrete additive is a pigment.

3. The system of claim 1, wherein during the medium speed, the valve alternates between an open position for about 0.75 seconds to about 2 seconds, and a closed position for about 0.75 seconds to about 2 seconds.

4. The method of claim 1, wherein during the medium speed, the valve alternates between an open position for about 1 second, and a closed position for about 1 second.

5. The method of claim 1, wherein during the low speed, the valve alternates between an open position for about 0.3 seconds to about 0.8 seconds, and a closed position for about 1.3 seconds to about 1.8 seconds.

6. The method of claim 1, wherein during the low speed, the valve alternates between an open position for about 0.5 seconds, and a closed position for about 1.5 seconds.

7. The method of claim 1, wherein during the inch speed, the valve alternates between an open position for about 0.1 seconds to about 0.3 seconds, and a closed position for about 2 seconds to about 4 seconds.

8. The method of claim 1, wherein during the inch speed, the valve alternates between an open position for about 0.25 seconds, and a closed position for about 2.5 seconds.

9. The method of claim 1, wherein the valve operates at the medium speed when the weight of water and concrete additive in said weigh vessel is about 50 pounds from the target batch weight.

10. The method of claim 1, wherein the valve operates at the low speed when the weight of water and concrete additive in said weigh vessel is about 15 pounds from the target batch weight.

11. The method of claim 1, wherein the valve operates at the inch speed when the weight of water and concrete additive in said weigh vessel is from about 1 pound to about 4 pounds from the target batch weight.

\* \* \* \* \*